Jan. 20, 1970

L. GIDGE 3,490,976

METHOD AND APPARATUS FOR MAKING NON-WOVEN STRUCTURES

Filed Aug. 16, 1966

INVENTOR
LESTER GIDGE
BY George A. Skoler
ATTORNEY

Jan. 20, 1970 L. GIDGE 3,490,976
METHOD AND APPARATUS FOR MAKING NON-WOVEN STRUCTURES
Filed Aug. 16, 1966 7 Sheets-Sheet 4

INVENTOR
LESTER GIDGE
BY George A. Skoler
ATTORNEY

INVENTOR
LESTER GIDGE

Jan. 20, 1970 L. GIDGE 3,490,976
METHOD AND APPARATUS FOR MAKING NON-WOVEN STRUCTURES
Filed Aug. 16, 1966 7 Sheets-Sheet 6

INVENTOR
LESTER GIDGE
BY George A Koler
ATTORNEY

INVENTOR
LESTER GIDGE
BY George A Skoler
ATTORNEY

United States Patent Office 3,490,976
Patented Jan. 20, 1970

3,490,976
METHOD AND APPARATUS FOR MAKING NON-WOVEN STRUCTURES
Lester Gidge, Nashua, N.H., assignor to Union Carbide Corporation, a corporation of New York
Filed Aug. 16, 1966, Ser. No. 572,754
Int. Cl. B32b 5/08, 31/00; D04h 3/10
U.S. Cl. 156—179                                    15 Claims

ABSTRACT OF THE DISCLOSURE

A machine and method for looping multiple strands around upstanding pins carried by a pair of parallel, spaced-apart, chains, to form an advancing criss-criss network. The machine is of the type having a cradle oscillating laterally on a pivot below pin level, a carriage reciprocating longitudinally on the cradle and multiple strand guides on the carriage. It is characterized by mechanism for automatically accelerating the strand guides at each end of the lateral stroke, when the guides are outside the pins, to positively and rapidly loop the strands around the pins at high speed while the cradle, carriage and pins travel at lower speeds.

---

This invention is directed to the manufacture of strand structures, more particularly, to strand structures containing a plurality of planes of strands. The strands in each plane are in a direction traversing the direction of the strands in another plane, such as an adjacent plane, and the strands in each plane all extend in essentially the same direction. Preferably, the strands traverse at an angle other than 90 degrees.

Heretofore, there have been employed a plurality of methods and apparatus for the manufacture of strand structures of the above type. Such structures, as described above, are more easily produced than strand structures in which the strands are interlaced a plurality of times in a small area of the structure, such as woven and knitted structures. For this reason, the art has fostered developments in this area but the art has never been able to produce such a product with a sufficient degree of productivity to justify an enlarged development effort to employ such products in the marketplace.

There are described herein apparatus and methods which possess such advantageous production capabilities in terms of quality of product and rate of production that they stimulate one's imagination for new uses of such products because the present market for such products is below the capabilities of a few such apparatus. The process and the apparatus of this invention are capable of producing such strand structures at rates in excess of about 500 linear feet per minute, even capable of rates exceeding about 700 linear feet per minute, and rates greater than about 1000 linear feet per minute are possible. Thus, the process and apparatus of this invention achieve productivities unheard of in the industry. Moreover, the process and apparatus of this invention are capable of being rapidly varied, in a matter of minutes, to produce a multiplicity of different types of strand structures.

Related applications

There are described in copending applications Ser. No. 349,931, filed Mar. 6, 1964 (now U.S. Patent 3,345,231, of Oct. 3, 1967) and Ser. No. 528,191, filed Feb. 17, 1966 (now U.S. Patent 3,345,232, of Oct. 3, 1967), methods and apparatus for producing the above strand structures and from which the methods and apparatus of this invention are in some ways derived. The methods and apparatus of this invention constitute a unique improvement in the art established by the inventions described in these copending applications.

Background of the invention

In the said application, Ser. No. 349,931, there are described methods and apparatus for making the above strand structures which involve curvilinearly oscillating a strand carrier means about a pair of closely spaced parallel stretches containing loop-receiving elements mounted thereon, which stretches are continuously advancing in the same direction, while simultaneously reciprocating the strand carrier means in the direction and opposite direction of the general direction traveled by the stretches. The strand carrier means is looped about the loop-receiving elements mounted on one of the stretches because the forward motion of the strand carrier means and the oscillating motion carries such means directly into and through the loop-receiving elements. As a result of a reduction in the forward speed of the strand carrier means after it has passed through the loop-receiving elements on one of the stretches and it is brought to a position behind the loop-receiving elements which it has passed, simultaneous with reversal of the oscillating direction of the strand carrier means, it is brought through the loop-receiving elements thereby looping the strand about the loop-receiving elements. The strand carrier means is thereafter withdrawn from that stretch. After completion of the forward motion of its reciprocal motion, the strand carrier means is brought back, by the rearward motion of its reciprocal motion, to a start position from where it advances with continued oscillation towards the opposite stretch and effects the same looping action described previously. This action is continuously repeated. In the area between the closely spaced parallel stretches is formed the above described strand structure which travels in the direction of the stretches to a spreading zone where the stretches diverge. In most cases, the strands have a tendency to slide about each of the loop-receiving elements which are attached to the diverging stretches and the loop-receiving elements also pull on the strands so that this pulling action in transferred to the strand carrier means. As a result, such diverging action on the part of the stretches cause strands to be pulled from the strand carrier means with the result that the diverging stretches increase the amount of strands laid down on the machine for a given period of time.

It is also possible, in accordance with the method and apparatus described in the aforementioned application, to diverge only one of the stretches from the other, and therefore, the terms "diverging" stretches and similar language, as employed in that application and herein mean the action of spreading the stretches or each row of loop-receiving elements apart from each other so as to increase the area therebetween.

After the desired amount of stretching is achieved, that is, when the stretches reach the end of the stretching zone, one obtains the desired width of strand structure which the method and apparatus is geared to produce. Then the strand structure may be carried forward at that width and taken from the machine for whatever use desired.

In the process of this copending application, the strand carrier means oscillates in essentially a uniform arc through its complete oscillation from behind each of the loop-receiving elements on the pair of advancing stretches. The terminal portions of the arc formed by this oscillating action may curve slightly from the general curvature of the arc prior to the terminal portions.

An extremely unique feature of the method and apparatus of this copending application resides in the ability of the strand carrier means to reciprocate in, and opposite to, the machine direction while it simtluaneously undergoes oscillation. This feature creates substantial productivity and latitude in product structure which is totally unforeseen in view of the prior art. Another very significant feature of the method and apparatus of the copending application resides in diverging, as described above, the parallel stretches after looping is achieved. This has a tremendous effect on the productivity and gives great variations in the width of the strand structure one can produce. For example, the distance between the parallel stretches in the looping zone may be only 4 (or less than 4) to 10 (or more than 10) inches while the width of the final product can be 60 inches or less, to 30 feet or more, if desired. Thus, any width strand structure can be produced by the methods and apparatus described in the copending application. In fact, contrary to other strand structure methods and apparatus, the wider the ultimate strand structure produced by the methods and apparatus described in this copending application, the greater is the rate of production by such methods and apparatus.

In copending application Ser. No. 528,191 there are described apparatus and method improvements in the inventions described in copending application Ser. No. 349,931. One of the difficulties associated with the inventions described in copending application Ser. No. 349,-931, and which makes it difficult to obtain extremely high speeds of production, is that the curvilinear oscillation and the reciprocation action of the strand carrier means combine to provide direct entry between the loop-receiving elements along essentially a single arc. Thus, there must be appreciable accuracy in the alignment of the strand carrier means considerably prior to the position when it is about to pass between loop-receiving elements. In addition, as one enlarges the size of the equipment, the mass of the strand carrier means increases and the momentum of the strand carrier means necessary to achieve high productivity represents a considerable force. Stopping this force and changing the strand carrier means direction puts a great strain on the equipment. Thus, it becomes desirable to reduce this momentum so as to enhance the longevity of the apparatus. This, to a degree, is achieved by an invention set forth in application Ser. No. 528,191. In that application, the strand carrier means is oscillated and reciprocated in the manner described in application Ser. No. 349,931, but prior to passage of the strand carrier means between the loop-receiving elements, the oscillation is stopped and the strand carrier means is flipped by a separate action between the loop-receiving elements. Thus, the momentum built up in the strand carrier means as a result of oscillation and reciprocation is minimized by reducing the length of the arc of oscillation. Moreover, such a technique enhances the clearance of the strand carrier means between the loop-receiving elements and gives greater control over the passage of the strand carrier means between the loop-receiving elements.

However, as unique as these inventions are in the field, and as significant as they are in enhancing the manufacture of such strand structures, there are described herein considerable improvements in the methods and apparatus which are described in the aforementioned applications, particularly with respect to controlling the oscillation of the strand carrier means and looping the strand carrier means about the loop-receiving elements. There are also described herein systems for tensioning the loop-receiving elements during the looping action so as to insure accuracy and to avoid damage of the equipment employed.

Summary of the invention

The term strand carrier means is used herein to mean the multiple strand delivery guides referred to in the above mentioned patent applications, or the mechanical equivalent thereof, especially the terminal tips of the guides which pass through the spaces between the loop receiving elements. The apparatus and method of this invention comprise a continuous method of making the above strand structures which involve simultaneous curvilinear oscillation and reciprocation of a strand carrier means containing at least a strand extending therefrom between two rows, preferably two parallel rows, of loop-receiving elements which rows are traveling in the same general direction. The direction of oscillation of the strand carrier means is lateral to its direction of reciprocation and the reciprocation of such means is effected generally along the path of the direction of said rows. At the end of at least one such oscillation during one of the reciprocating motions, said strand carrier means is abreast one of said rows while it resides between said rows. Then the means is flipped, preferably, it is pivoted, across said row, and between and past loop-receiving elements in said row, to a position outside said rows whereby such strand emitted from said means extends between loop-receiving elements in said row. Then the strand carrier means is forcefully accelerated in a direction along essentially a path which is aligned abreast and along said row whereby said strand is partially looped about one of said loop-receiving elements. The strand carrier means is again flipped from outside said rows to between said rows whereby to complete the looping of said strand about at least one of said loop-receiving elements in said row. The strand carrier means is then moved to the other row of loop-receiving elements during said oscillation and reciprocation and the above procedure is repeated.

After completion of this action, the loop-receiving elements may continue in the same direction to where they are caused to change directions relative to each other whereby the distance between such rows of loop-receiving elements increases causing the spreading apart of the strand structure existing between the rows of loop-receiving elements and the strand structure is thereafter recovered from the loop-receiving elements. This involves "diverging" said rows, as discussed above.

For the purpose of rendering a more specific characterization and illustration of this invention, recourse is made to the accompanying drawings and the description which follows. The drawings and the following description are not intended for the purpose of limiting this invention. It is readily apparent that a plurality of equivalent conveniences and apparatus may be employed instead of those which are characterized below and in the drawings to achieve these inventions and such should be obvious to those having ordinary skill in this art.

FIGURE 2 is a schematic plan view of the apparatus of FIGURES 1 and 1a.

Figure 1:
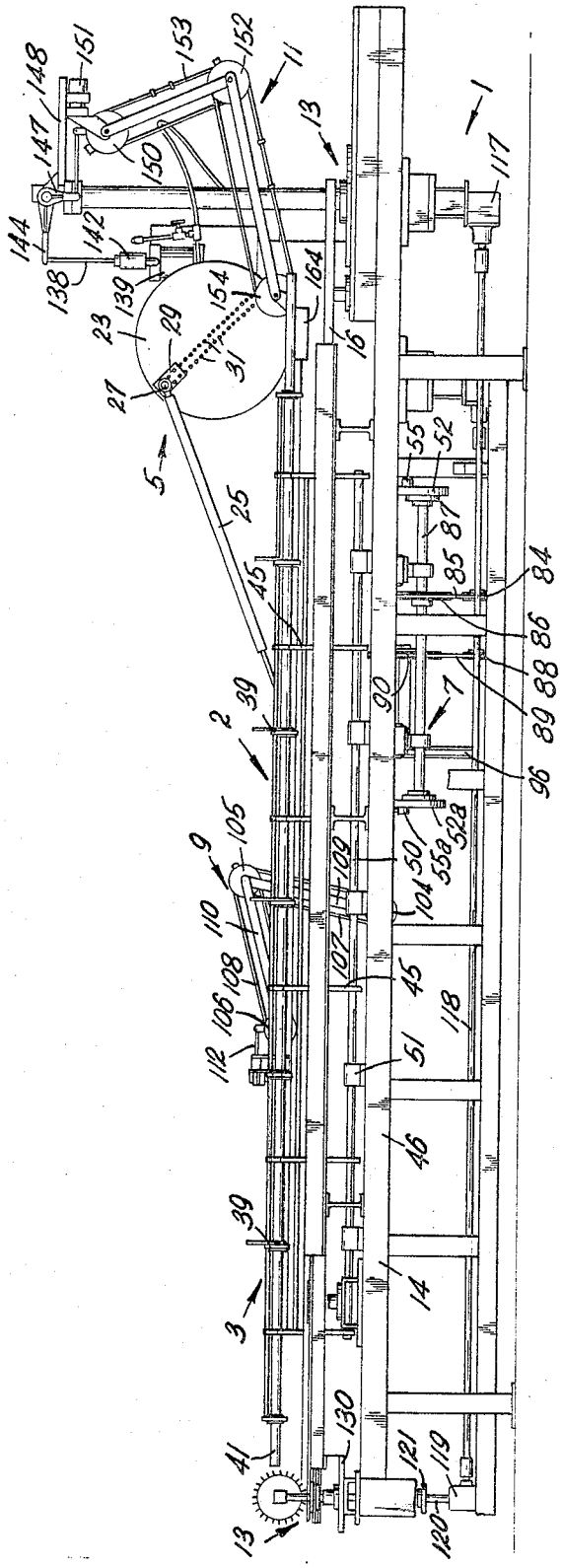
FIGURE 1 is a side-elevational view of part of an apparatus within the purview of this invention and which is capable of carrying out the method of this invention.

Referring to the drawings, apparatus 1 (FIGURE 1) is a machine for producing the aforementioned strand structures. Its construction comprises two basic zones, the looping zone 2 and the spreading and take-off zone 4. The looping zone 2 is where the structure of the strand arrangement is created and the spreading and take-off zone 4 is the zone in which the ultimate width of the strand structure is achieved. The apparatus contains a carriage assembly 3, a reciprocation assembly 5, an oscillation assembly 7, a flipper assembly 9, a strand carrier means acceleration assembly 11 and a chain drive assembly 13 as basic structural identities making up apparatus 1. All of these assemblies are supported by frame 14 which is supported on a plurality of legs.

Apparatus 1 comprises two rows of stretches in the form of endless chain 15 and endless chain 17 (FIGURES 1–6). Endless chain 15 rides in chain track 16 and endless chain 17 rides in chain track 20. Resting atop these stretches are loop-receiving elements in the form of pins 18 and 19, which pins are preferably bent inwardly and outwardly, each towards the pins in the opposite row, as described in the aforementioned copending applications. The chain tracks 16 and 20 are interconnected through track connecting plate 22.

When apparatus 1 is not operating a plurality of feed tubes, or strand guides, 21 rest at a higher elevation between endless chains 15 and 17 in a looping zone 2. Chains 15 and 17 are essentially parallel in looping zone 2, though this is not critical in practicing this invention.

Feed tubes 21 extend in a row through feed tube shaft 24 and are vertically aligned when apparatus 1 is employed in an upright position. The spacing between each tube 21 and an adjacent tube 21 is essentially the same as the distance between each pin 18 and an adjacent pin 18 and the distance between each pin 19 and an adjacent pin 19. Preferably, the space between each pin 18 and the adjacent pin 18 and each pin 19 and an adjacent pin 19 is essentially the same, and most desirably the space is the same.

Figure 5:
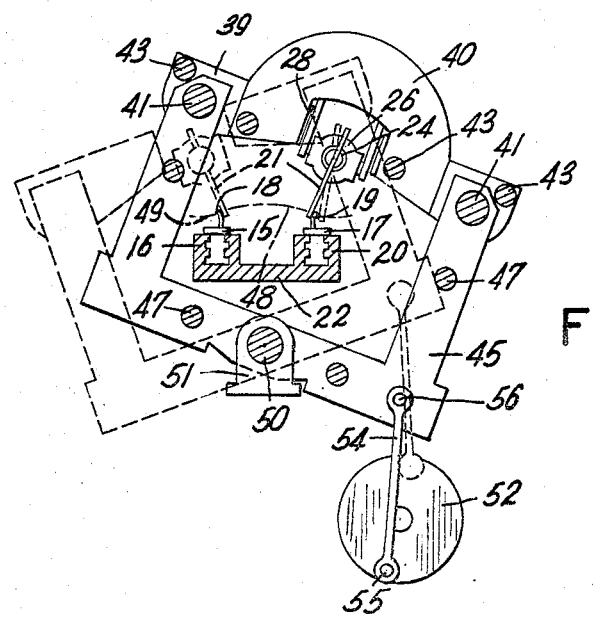
FIGURE 5 is a schematic end view of part of the carriage of FIGURE 4 showing the oscillating and flipping motion of the strand carrier means.

In the operation of apparatus 1, endless chains 15 and 17 travel in the direction of zone 4 at the same speed, the speed being controlled through chain drive assembly 13. During the travel of chains 15 and 17, feed tube shaft 24 oscillates and reciprocates in zone 2. If desired, at the terminus of each leg of an oscillation, feed tube shaft 24 carrying feed tubes 21 is flipped, as shown in FIGURE 5, whereby feed tubes 21 are caused to pass between and past either pins 19 or pins 18 depending upon which leg of the oscillation is being considered. Upon completion of each oscillation, with or without flipping of feed tubes 21, the feed tube shaft 24 is caused to either complete its particular reciprocating motion followed by the opposite direction of reciprocation or directly proceed in the opposite direction of that particular reciprocating motion.

As a result of this oscillation and reciprocation, coupled with flipping of feed tubes 21 between and past the upstanding pins, i.e., 18 or 19, followed by forceful acceleration of feed tube shaft 24 across the back of, or longitudinally outside of, pins 18 or 19 and return flipping of feed tubes 21 between and around pins 18 or 19, there occurs looping of feed tubes 21 about either pins 18 or 19, depending upon which leg, or stroke, of the oscillating motion which is undergoing action. After the final return flip of feed tubes 21 to the point of termination of the particular leg of oscillation being employed, feed tube shaft 24 is either carried forward in continuance of that particular motion of the reciprocating action or is directly withdrawn in the opposite direction to complete the reciprocating action.

As the upstanding pins 18 and 19, resting upon their respective endless chains 15 and 17, travel through looping zone 2, there is formed, as described above, the basic structure of the strand structures of this invention. The process of this invention may be terminated within looping zone 2 and the product may be withdrawn therefrom for whatever use desired. Upon completion of the looping action, endless chains 15 and 17 can carry this structure forward into spreading and take-off zone 4 where the structure is spread apart as a result of divergence of endless chains 15 and 17. As the endless chains 15 and 17 are carried forward and diverge, strands which are looped about pins 18 and 19 are constantly pulling more of such strand from strand supply spindles, beams, or other types of strand packages (not shown) into tubes 21 and the same continuous strand is looped around succeeding pins by passage from feed tubes 21. Because the distance between endless chains 15 and 17 in looping zone 2 may be very small, say from about 2 to about 12 inches, feed tube shaft 24 can be caused to reciprocate and oscillate at extremely high speeds whereby to effect a very rapid looping action. Divergence of the endless chains 15 and 17 in spreading and take-off zone 4 causes a rapid acceleration of application of strand to apparatus 1. In fact, as one increases the divergence of chains 15 and 17, and produces a wider spreading and take-off zone 4, the desired strand structure is produced at a greater rate.

Figure 3:
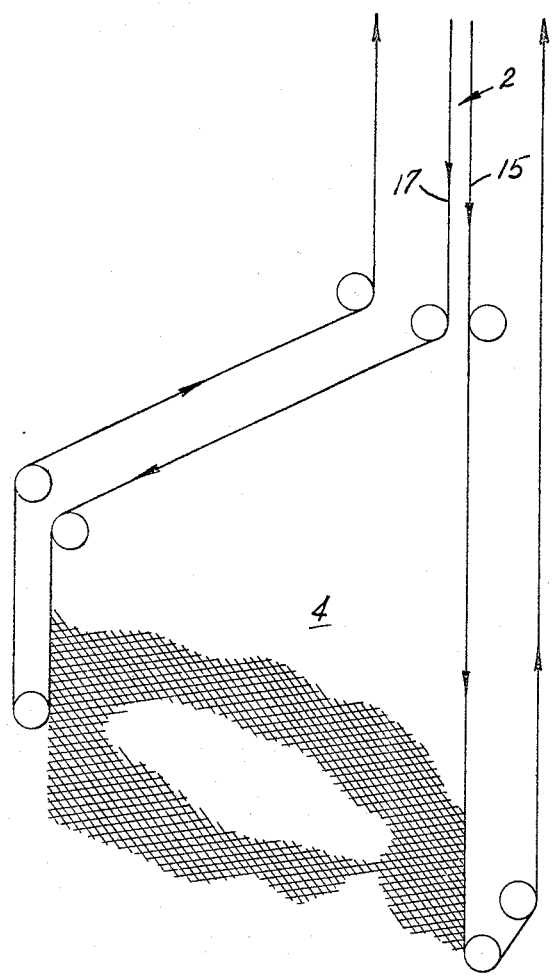
FIGURE 3 is a schematic plan view of a variation of the apparatus shown in FIGURES 1–2.

As shown in FIGURE 3, spreading and take-off zone 4 may be effected with only angular divergence of one endless chain, for example, endless chain 17. In fact, the embodiment shown in FIGURE 3 is most desirable in producing a strand structure wherein the strands which cross do so at an extremely large angle, e.g., one which approaches 90°.

Figure 4:
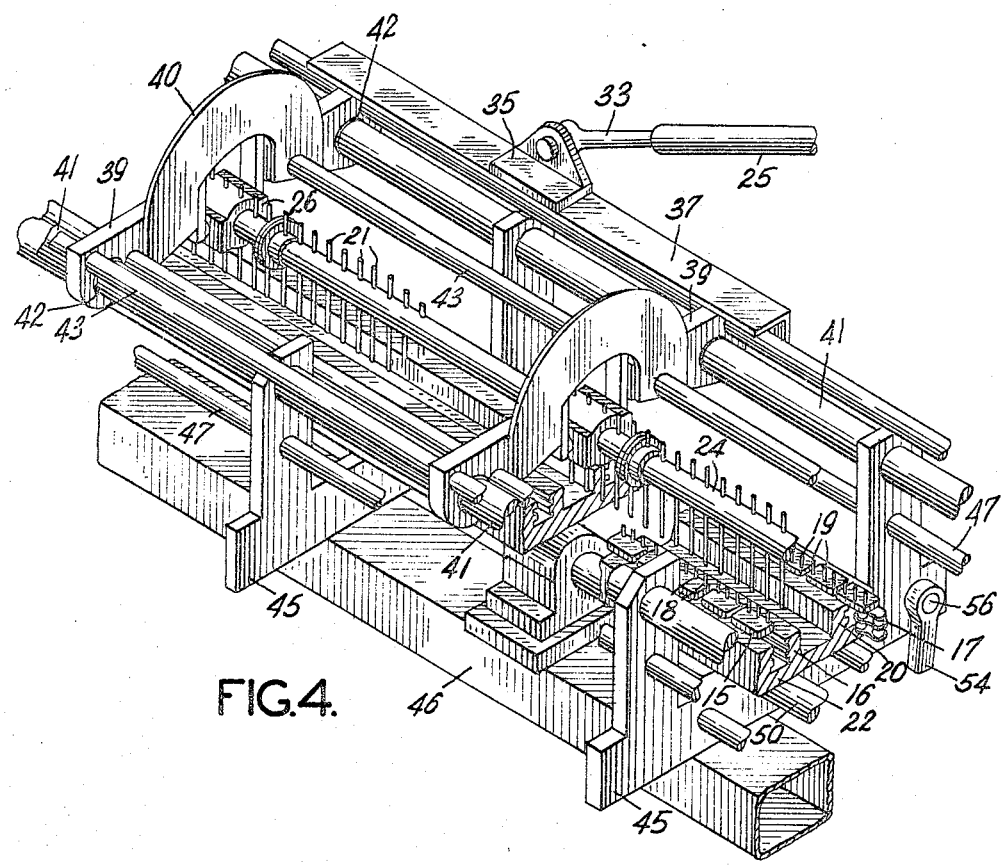
FIGURE 4 is an isometric detail view of a section of mechanism in the looping zone showing a carriage assembly, loop-receiving elements and strand carrier means, all of which are characterized in the apparatus of FIGURE 1.
Figure 6:
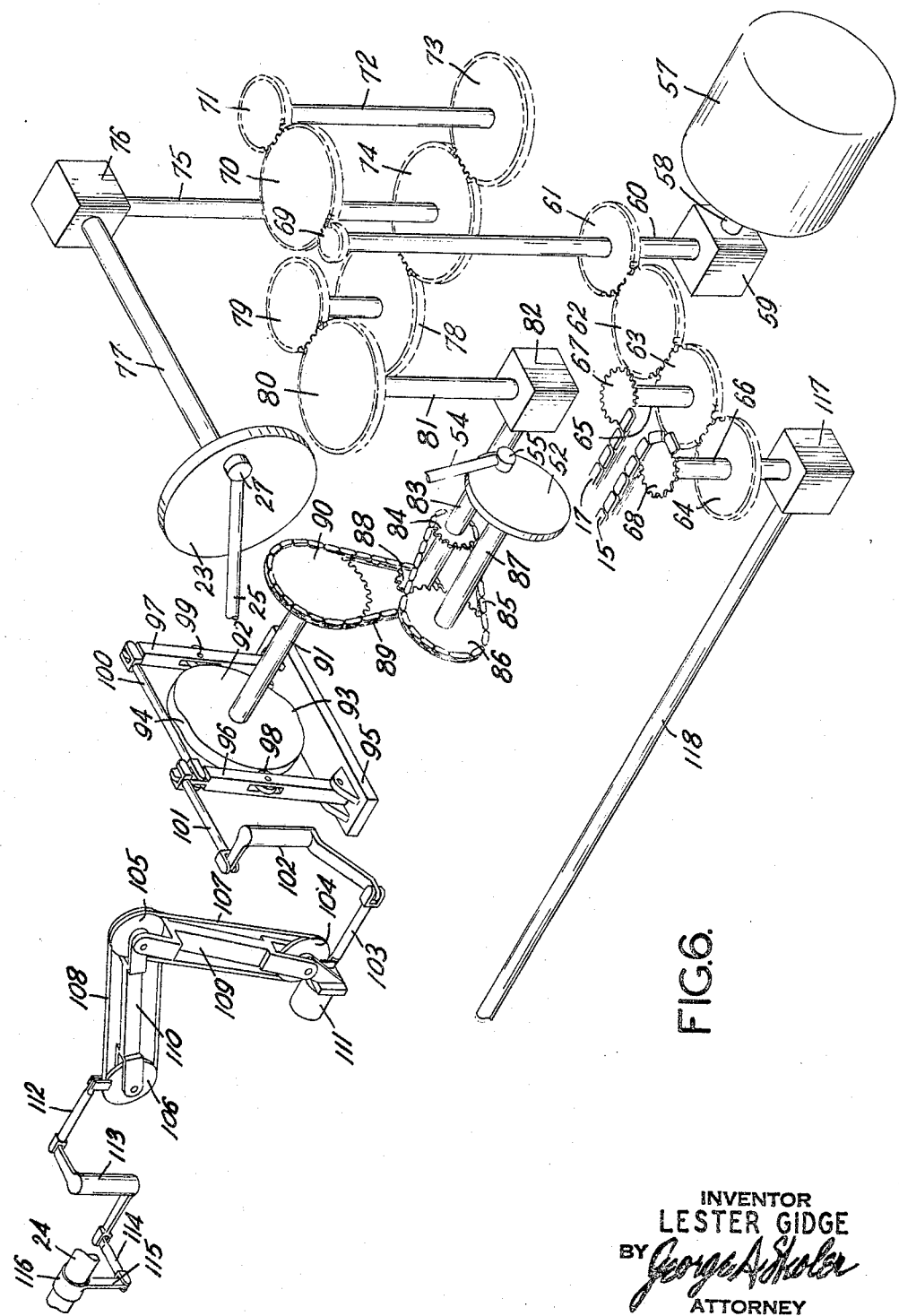
FIGURE 6 is a schematic isometric illustration of the motion train driving and coordinating the moving elements shown in FIGURES 1–5.
Figure 7:
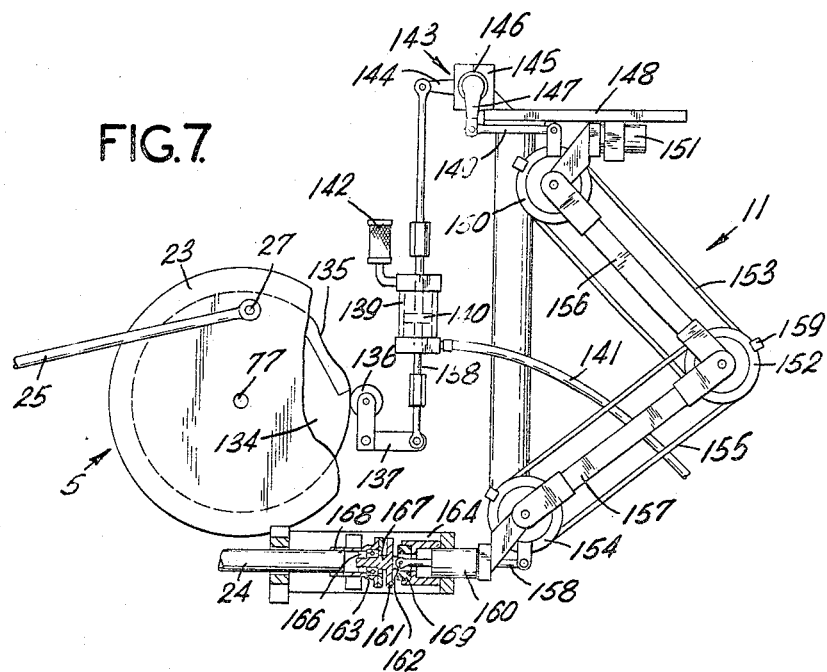
FIGURE 7 is a detail side view of the mechanism which forcibly accelerates the strand carrier means in the looping action.

Feed tube shaft 24 is reciprocated by revolving face plate 23 to which is secured crank shaft 25. Crank shaft 25 is directly secured to adjusting plate 29 through ball-bearing pin-connection 27 (FIGURES 6 and 7). Adjusting plate 29 is bolted to face plate 23 through threaded holes 31 which are located on face plate 23 in a predetermined manner according to the desired reciprocating action. Thus, adjusting plate 29 can be set on face plate 23 by bolting it in the particular holes 31 which achieve the desired reciprocating action (FIG. 1). Crank shaft 25 is connected at its other end to connecting rod 33 which is pin-connected to flange plate 35 (FIG. 4). Flange plate 35 is welded to angle plate 37 which in turn is welded to bridge element 39. Thus, through the stroking action of crank shaft 25, feed tube shaft 24, which is secured through element 39, is caused to reciprocate in a forward and rearward motion, the forward motion being in the machine direction and the rearward motion being opposite to the machine direction.

Bridge elements 39 are interconnected by bridge connecting shafts 43 and they slide back and forth across slide shafts 41 on slide bearings 42. Bridge elements 39 which oppositely face each other are interconnected by bridge plates 40. Bridge plates 40 extend over shaft collars 26 which are fastened about feed tube shaft 24 (FIGURE 4).

Slide shafts 41 extend through and are fixed to carriage support frames 45. Carriage support frames 45 are U-shaped and their vertical arms extend about chain tracks 16 and 20 (FIGURES 4 and 5). Extending through the base of carriage support frames 45 is oscillating shaft 50 mounted in suitable bearings. Shaft 50 is supported above center support 46 by suitable bearings 51. The various carriage support frames 45 are also interlocked by frame connecting shafts 47. Two carriage support frames 45 have crank shafts 54 fixed thereon each through pivot pins 56. Crank shafts 54 are directly connected to crank wheels 52 and 52a as shown in FIGURES 1 and 5, through pivot pins 55 and 55a.

Upon revolution of crank wheels 52 and 52a the pulling and pushing motion of crank shafts 54 causes carriage support frames 45 to oscillate upon shaft 50. Since bridge elements 39 are directly connected to bridge connecting shafts 43, all such elements react in concert. And because elements 39 are directly affixed to slide shaft 41, bridge elements 39 respond to the oscillating motion of carriage support frames 45.

As shown in FIGURE 5, upon oscillation of carriage support frame 45, and hence, oscillation of bridge elements 39, to which are connected feed tubes 21—through feed tube shaft 24, shaft collar 26, pins 32, pendulum arm 28, pins 30, which are directly connected to bridge flanges 34 attached to bridge plate 40—there is achieved an oscillation of feed tubes 21 to a position adjacent one of the rows of upstanding pins 18 or 19 at one of the termination points the curvilinear oscillation path 48. This oscillation occurs simultaneously during reciprocation of the feed tubes 21. Reciprocation occurs from the forward and backward motion of bridge elements 39 on slide shafts 41 by the reciprocation of crank shaft 25 attached to bridge elements 39. When feed tubes 21 reach a point adjacent to upstanding pins 18 or 19 and between the rows of pins 18 and 19, they may be flipped along curvilinear flipping path 49 between upstanding pins 18 or 19 to a position behind, or outside, these upstanding pins, as shown in phantom in FIGURE 5.

Figure 10:
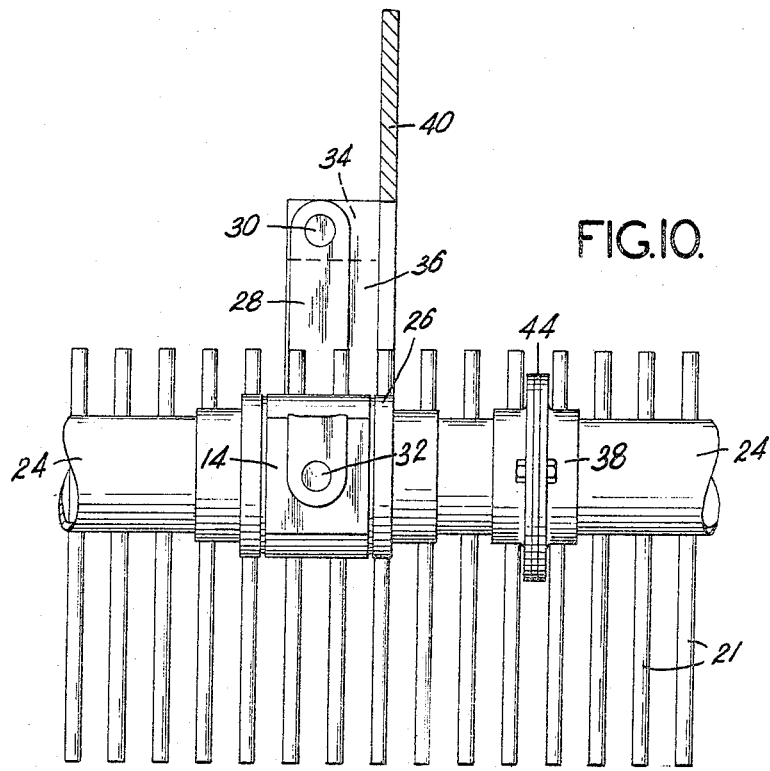
FIGURE 10 is a detail of a section of the pendulum mechanism of the strand carrier means and the sectional construction of the strand carrier means.

Because shaft collar 26 is appended to pivoting pendulum arm 28 through pin 32, feed shaft tube 24 is capable of reciprocating slightly forward or back along the arc of pendulum arm 28. Pendulum arm 28, see FIGURE 10, is pivotally mounted on pin 30 which is secured to bridge flange 34.

Upon completion of the flipping motion of feed tubes 21 along curvilinear flipping path 49, as shown in FIGURE 5, to a position behind pins 18 or 19 (shown in phantom FIGURE 5 behind pins 19), feed tube shaft 24 can be caused to accelerate rapidly in either a forward or backward direction along the arc of pendulum arm 28 by application of a force to feed tube shaft 24. Thus, feed tubes 21 are caused to forcefully transverse the curvilinear flipping path 49, that is, forcefully attain a path lateral of the curvilinear flipping path 49, so that the feed tubes are forcefully accelerated in either the direction of travel of the pins 18 and 19 or in the opposite direction to quickly cause each feed tube 21 to travel about at least one of the upstanding pins 18 or 19 which is adjacent at least one such feed tube 21. This occurs before or at the same time as the flipping motion of feed tubes 21 is reversed whereby feed tubes 21 are caused to again ride along curvilinear flipping path 49 into the terminal point of curvilinear oscillation path 48. The reciprocating motion of feed tube shaft 24 is completed and the opposite motion in the total reciprocating action is started.

If the looping action of feed tubes 21 about either upstanding pins 18 or 19 occurs upon the forward reciprocating motion of feed tube shaft 24, that is, the motion in the machine direction, then feed tube shaft 24, after looping feed tubes 21 about one row of pins, is brought back to a rearward position in the neighborhood of chain drive assembly 13. And with simultaneous oscillation and the forward motion of reciprocation of feed tube shaft 24, it is brought to a position adjacent to the row of pins 18 or 19 which is opposite to the row of pins from which it has just travelled. The flipping action is repeated, as described above and illustrated in FIGURE 5, while the feed tube shaft 24 is in the forward stroke of the reciprocating motion. Thus during some point of the reciprocating motion, particularly when feed tubes 21 are adjacent to the row of upstanding pins 18 or 19, and at the terminus of one lateral stroke or leg of the curvilinear oscillation path 48, the speed of feed tube shaft 24 is essentially equivalent to the speed of chains 15 and 17. After looping is achieved about this other row of pins, in the manner described above, the reciprocating, oscillating and flipping actions are repeated so that feed tubes 21 pass back and forth and about the rows of pins 18 and 19.

It will be understood that if the strand carrier means, or guides, are flipped through the pins, flipped rearwardly outside the pins and then flipped back through other pins while the feed tube shaft is on its rearward stroke, the strands are partially encircled around the pins in a simple loop. If the guides are flipped forwardly, however, the strands are entirely encircled around the pins, which imparts a snubbing action so that when the rows of pins are diverged, the strands tend to be attenuated. It is preferred, however, that the encirclement not be total, so that divergence of the rows of pins will draw strand through the tubes without undue resistance.

The mechanics employed to effect the aforementioned reciprocation, oscillation, flipping, and the motion of endless chains 15 and 17, are particularly well illustrated in FIGURE 6.

Motor 57 is connected through drive shaft 58 to bevel gear box 59 with bevel gears therein. The drive is transmitted to vertical shaft 60 on which are attached gear 61 and drive gear 69. Meshed between gear 61 and chain drive gear 63 is idler gear 62. Thus motor 57 drives endless chains 15 and 17 through connection to chain drive assembly 13. Chain drive gear 64 is meshed with gear 63 and both gears, in synchronization, through chain drive shafts 65 and 66 drive double-tooth sprockets 67 and 68 about which pass endless-chains 15 and 17.

Drive gear 69 is connected to adjusting gear 71 through idler gear 70. One may alter the speed ratio between gears 71 and 69 by changing the size of gears 71 and 70. The drive is then transmitted from adjusting gear 71 to gear connecting shaft 72 causing drive transfer gear 73 to rotate. Gear 73 which is meshed with gear 74 causes vertical face plate drive shaft 75 to rotate. Bevel gears 76 carry rotational force from shaft 75 to shaft 77 which causes rotation of face plate 23. This causes reciprocation of crank shaft 25. Drive transfer gear 78, intermeshed with gear 74, causes stroke adjusting drive gear 79, through a suitable shaft, to rotate and move stroke adjusting drive gear 80 which is intermeshed therewith. By varying the gear size of gears 80 and 79, it is possible to effect an alteration in the number of reciprocations per single ocillation.

Thus feed tube shaft 24 can be caused to reciprocate twice or more times for every complete oscillation cycle or effect one-half or less reciprocation for every full oscillation.

Revolution of shaft 81 connected to gear 80 is transmitted through bevel gears 82 to main shaft 83. Oscillating drive sprocket 84 is fixed to main shaft 83 and drives endless chain 85 whereby to rotate the transfer sprocket 86. Sprocket 86 causes oscillating shaft 87 to rotate and, thus, crank wheel 52 and crank wheel 52a (not shown), which are connected to shaft 87, are caused to rotate and effect, through crank shafts 54, oscillation of carriage support frames 45, as described previously.

Main shaft 83 is also connected to flipper drive sprocket 88, which is connected through endless chain 89 to cam drive sprocket 90. Sprocket 90 drives cam drive shaft 91, which in turn drives cam wheel 92.

Cam wheel 92 possesses, on its edge surface, convex cam surface 93 and concave cam surface 94 thus, providing a modified heart cam action. Follower pivoting arms 96 and 97 are connected to plate 95 by a pivoting bearing. On each arm 96 and 97 is a roller follower 98 which is in direct contact with edge surface of cam wheel 92, as shown in FIGURE 6. Followers 98, with suitable bearings, each rotate about a pin 99. Arm 97 is connected to arm 96 through connecting rod 100. Extending from arm 96 is cam response arm 101.

As cam wheel 92 rotates, followers 98 concurrently respond to the deviation in the surface uniformity of the edge of wheel 92, shown as cam surfaces 93 and 94, causing arms 96 and 97 to jerk in either a forward or backward motion, as desired.

The motion transmitted to arms 96 and 97 is transferred to response arm 101 which is pivotally connected to motion transfer lever 102. This motion is transferred to rod 103 which is pivotally connected to lever 102.

Rod 103 is directly connected to a pulley wheel 104. In view of the many motions transmitted to pulley 104 during the utilization of apparatus 1, the connection between rod 103 and pulley wheel 104 should be a very flexible knuckle connection.

Pulley wheels 104, 105 and 106 are inter-connected by pulley cables 107 and 108. Pulley wheel 105 is a double grooved wheel and accepts cables 107 and 108 in separate grooves. Wheels 104 and 105, and 105 and 106, are separated by rigid doubleforked members 109 and 110. Cables 107 and 108 are extremely tight, applying maximum tension on wheels 104, 105 and 106, thereby precluding any slippage of the cables. Each wheel contains a depression in the cable groove so that a bolt extending through a small plate which is welded to the edges of the wheels and crosses the groove, forces cables into the depression thereby securely fixing each cable to each wheel. Alternatively, each cable can be spot-welded to each wheel it contacts.

Double-forked member 109 is connected to a plate, as shown in FIGURE 6, which is fastened to bearing 111, which is preferably a ball bearing.

Thus, the jerking of rod 101 is transmitted to lever 102, to rod 103, which because it is securely fastened to pulley wheel 104, causes wheel 104 to move the distance of the jerking motion. This causes cable 107 to move, which in turn moves pulley wheel 105 and transmits the same motion to cable 108, which in turn, transmits the distance of the jerking motion to pulley wheel 106. Rod 112 is pivotally fastened with a knuckle joint to pulley wheel 106. Rod 112 is pivotally connected to lever 113 which transmits the motion to transverse rod 114. Rod 114 is pivotally connected to both lever 113 and vertical arm 115. The forward and backward motion of rod 112 gives transverse rod 114 a sideward motion through the action of lever 113. This sideward motion is transmitted to vertical arm 115 which is securely fastened to collar 116 which circumscribes and is securely connected to feed tube shaft 24. This causes feed tube shaft 24 to rotate in response to the jerking motion of rod 101. Feed tubes 21 which extend through shaft 24 are caused to flip as a direct result of this jerking motion. Since the cam surfaces of wheel 92 are coordinated with the oscillation achieved through crank wheel 52, each flipping action of tubes 21 may occur at the termination of each half of the full oscillation of carriage support frame 45.

Figure 2:
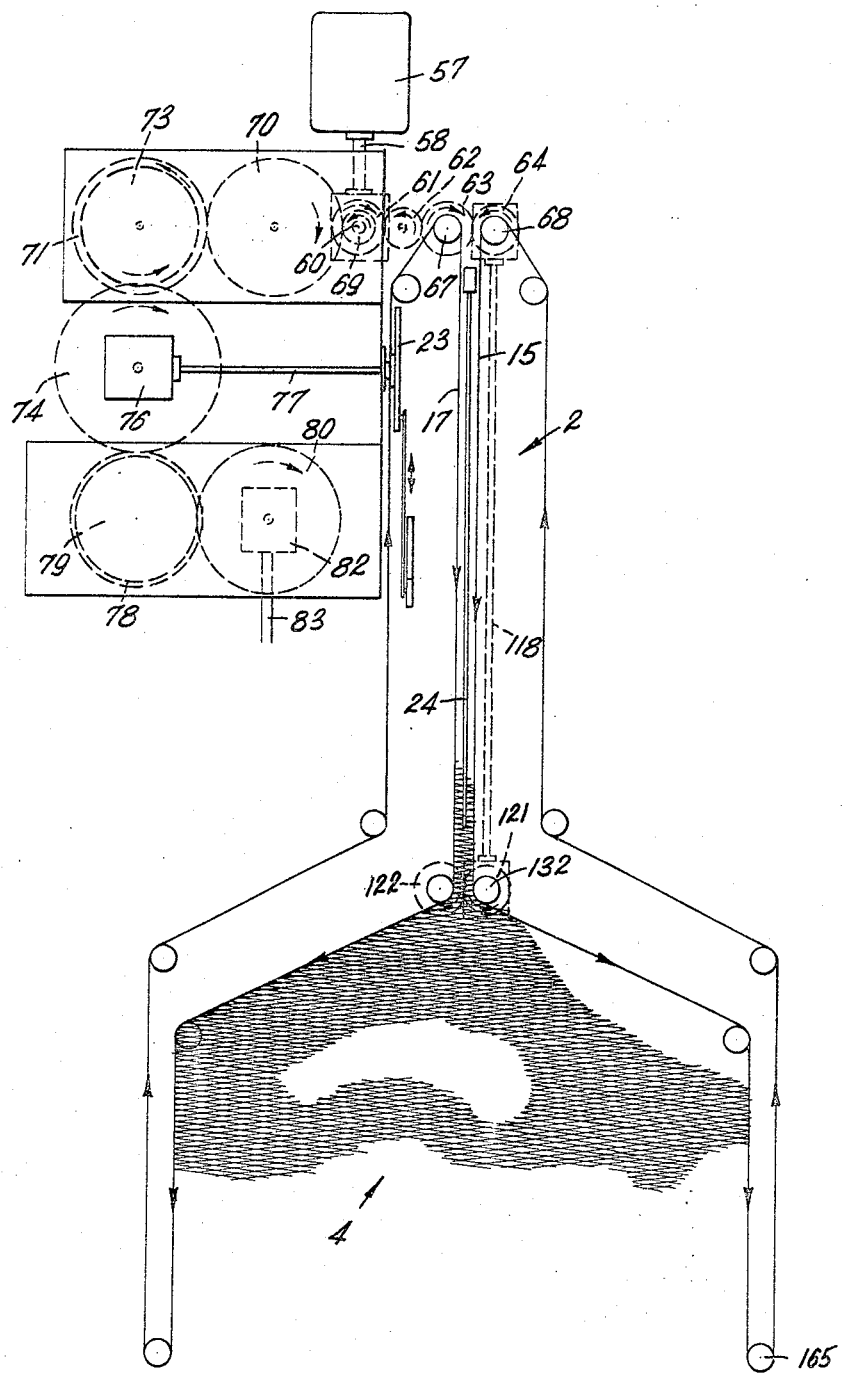

Because of the ultimate wear upon endless chains 15 and 17 during continuous use of apparatus 1, there is considerable likelihood that the space between each link of each chain will become enlarged. As a result, each chain will tend to become less taut as it winds itself in its endless path as shown in FIGURES 2 and 3. However, the tautness of endless chains 15 and 17 is only critical as the chains undergo movement through looping zone 2. Therefore, it is important to maintain the chains under as much tension as is advisable during that period of passage through looping zone 2.

This can be accomplished by maintaining the endless chains 15 and 17 taut as they pass between sprockets 67 and 68, located at the back of looping zone 2, and sprockets 132 located at the forward end of looping zone 2 where the endless chains 15 and 17 enter spreading and take-off zone 4. This is achieved by synchronizing the drive between chain drive assembly 13 and sprockets 132 so that sprockets 132 hold and push endless chains 15 and 17 with a slightly greater force than do sprockets 67 and 68.

One such technique for achieving this involves transmitting the rotational force of chain drive shaft 66 through bevel gears 117 to chain drive extension shaft 118, see FIGURES 1 and 6. Shaft 118 connects to bevel gears 119 causing rotation of vertical shaft 120. Shaft 120, held in position with suitable bearings, terminates almost flush with the upper surface of face plate gear 121 (see FIGURES 8 and 9) which is intermeshed with face plate gear 122. Shaft 120 drives gears 121 and 122. Gears 121 and 122 are exact duplicates and function in the same manner, thus the description below with respect to gear 121 pertains also to gear 122. Gear 121 serves to drive chain 15 and gear 122 serves to drive chain 17, both through the same mechanism. However, it should be pointed out that gear 122 rides on an idler shaft (not shown) which fits in gear 122 as shaft 120 fits in gear 121.

Figure 9:
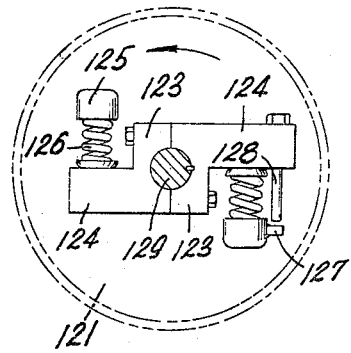
FIGURE 9 is a plan view taken along line 9—9 of FIGURE 8 illustrating details of the spring-loaded tensioning device of FIGURE 8.
Figure 8:
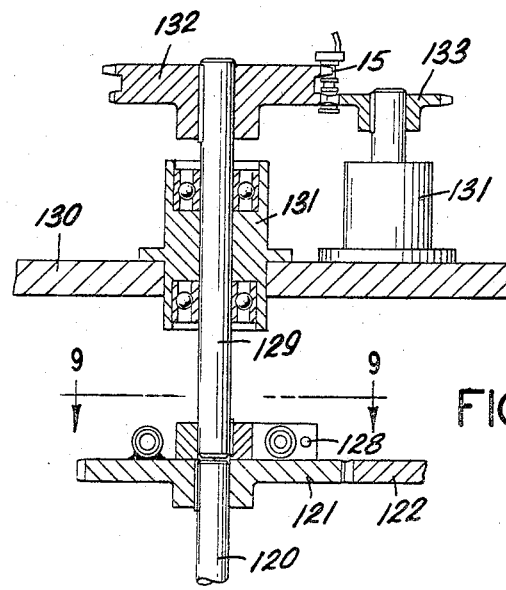
FIGURE 8 is a cross-sectional side view showing details of the chain tensioning mechanism.

As shown in FIGURES 8 and 9, extending from double-tooth drive sprocket 132 to collar 123 containing flange extensions 124, is tensioning shaft 129. Tensioning shaft 129 is slightly spaced from contact with vertical shaft 120 and is locked to collar 123. Shaft 120 does not contact collar 123. Welded to the surface of gear 121 are spring cups 125. Interior of each cup 125 is a spring 126, each under tension and load. Springs 126 press against flange extensions 124. Extending from one cup 125 is a stopper flange 127 and extending through the flange extension 124 opposite stopper flange 127 is a threaded set screw 128 slightly spaced from making contact with flange 127. Thus, upon fatigue of springs 126, drive of sprocket 132 can still be effected as a result of direct contact between screw 128 and flange 127 until such time as replacement of the springs is effected. It should be emphasized that collar 123 and flange extensions 124 are not fixed to gear 121 and are actually slightly spaced from the surface of gear 121. As shaft 120 rotates gear 121, see FIG. 9, springs 126, which are under load, viz, 500 lbs., thrust flange extensions 124 in the same direction, always with a slightly greater force than is achieved by the rotation of shaft 120. Since shaft 129 is directly locked to collar 123, shaft 129 rotates at the velocity resulting from this additional force and thrust achieved by springs 126.

Shaft 129 extends through frame plate 130 and bearing 131 into double-tooth drive sprocket 132. Sprocket 132 contains an upper and a lower row of teeth and the teeth in the lower row are ground down such that as each link of, say, chain 15 is carried by the teeth of sprocket 132, the teeth in the lower row do not extend through, and only very slightly into, the open spaces of such links. Supported on frame plate 130 is bearing 131 which supports an idler shaft extending into idler sprocket 133. Idler sprocket 133 contains a single row of teeth which are aligned with the lower row of the ground-down teeth of sprocket 132. The teeth of idler sprocket 133 are spaced apart the same distance as the teeth of sprocket 132. Thus, each tooth of idler sprocket 133 can extend into the same opening of the links of chain 15 as do the teeth in the lower row of sprocket 132, whereby to grip each link from both sides of its openings as it passes about sprocket 132. As a result, chain 15 is securely locked into position and kept from wavering as it passes about sprocket 132.

As pointed out previously, feed tube shaft 24 can be caused to accelerate in either a forward or rearward direction on pendulum arm 28 at the termination of one pass of the curvilinear flipping path 49. If feed tube shaft 24 is caused to accelerate forward, then its speed during that acceleration will be greater than the speed of the reciprocation motion at that particular time. If the direction of the acceleration motion is opposite to the particular reciprocating motion being applied at the moment, then the speed of such acceleration need not exceed that of the speed of the particular reciprocating motion being applied at that moment. However, such acceleration in the reverse direction of the reciprocating motion should be sufficient to be classified as a state of acceleration from zero to some speed and not merely a deceleration of the motion of the particular reciprocating action being applied at that moment. Thus, the terms "acceleration," "accelerating," and the like, as used herein and in the claims, means a forward or rearward acceleration as described above.

One such mechanism for achieving this is described in FIGURES 1 and 7. Spaced behind face plate 23 and driven by shaft 77 is came wheel 134 possessing concave cam surface 135. Roller cam follower 136 which abuts the edge of cam wheel 134 is secured to one end of lever 137. The other end of lever 137 is pin-connected to vertical rod 138. Vertical rod 138 is pin-connected at its other end to lever arm 144. Piston 140 is located on rod 138 and it is circumscribed by air cylinder 139. Air cylinder 139 possesses air intake tube 141 and air vent tube 142. By maintaining a greater pressure in the lower half of air cylinder 139 against the bottom surface of piston 140, follower 136 is forced against the cam surface of wheel 134. Such a cylinder arrangement can be replaced by appropriate springs, but, however, it is believed that this air cylinder arrangement provides the best following action along the cam surface.

Lever arm 144 transmits the jerking motion effected by the dip of follower 136 on concave cam 135, to lever assembly 143 held in position by multiple bearings 145. Lever assembly 143 comprises arm 144 connected to extended rod 146 terminating at lever arm 147. Rod 146 is of sufficient length whereby to bring the mechanism for transmitting acceleration to the appropriate position on apparatus 1 above chain drive assembly 13. Bearing 145 is directly connected to support plate 148 which in turn rests upon a support column extending from the frame of apparatus 1.

The jerking motion which forces arm 144 up, causes rod 146 and arm 147 to move in a clockwise direction and forces reciprocating rod 149 to move in the machine direction. Reciprocating rod 149 is pin-connected to arm 147 and pin-connected to pulley wheel 150. Pulley wheel 150 is tautly inter-connected with pulley wheels 152 and 154 by cables 153 and 155. The wheels are spaced apart by double forked members 156 and 157 having the construction of members 109 and 110 as shown in FIGURE 6. Wheel 150 is locked into bearing 151, a ball-bearing which allows wheel 150 to rotate during oscillation of wheel 154 which is responding to the oscillation of feed tube shaft 24. Bearing 151 is suitably connected to support plate 148. It should be appreciated that the connection of rod 149 to arm 147 and wheel 150 should be a rotational, pivoting knuckle joint or some other joint which allows suitable rotation.

The motion of arm 149 in the machine direction causes each of the pulley wheels to immediately move counter-clockwise. To ensure that there is immediate response to the jerking motion of rod 149, cables 153 and 155 are securely locked about wheels 150, double wheel 152, and wheel 154, by fasteners 159 which comprise a small welded bridge which passes over the grooves of the pulleys and into and through which is screwed a lock screw. By turning the lock screw towards the cable, it pushes the cable against the grooved surface. By placing a slight depression in the grooved surface opposite to the position of each lock screw, the cables can be forced into the hole by the screw thereby locking the cables about the pulleys. The cables are maintained taut by any one of a number of tensioning devices provided thereon. For example, one may employ a right-and-left-hand screw coupling on each of the cables with suitable lock nuts to prevent slippage. This tensioning device can be utilized also on cables 108 and 107.

Reciprocating rod 158 is pin-connected to wheel 154 through a knuckle joint. Also, wheel 154 and member 157 are directly connected to bearing 160. Bearing 160 is secured to carriage extension frame 164. Rod 158 is pin-connected to threaded shaft 167 through a flexible knuckle joint. Shaft 167 is secured inside of housing 168 by lock screw 166 and is given freedom for rotation by bearing 163. Housing 168 is fastened to feed tube shaft 24. In order to limit the motion of shaft 24 in response to the jerking motion transmitted through rod 158 from cam wheel 154, there is provided stop 169. Stop 169 may be made of any resilient material such as rubber, foam, soft wood, and the like, or a non-resilient material such as steel, and the like. Flange 161 circumscribing shaft 167 acts as a limit for shaft 24 when it makes contact with stop 169. The coupling 162 of rod 158 to shaft 167 may be a swivel shackle coupling, if desired.

It should be readily appreciated that if the cam surface 135 were convex then shaft 24 would be accelerated in a forward direction, i.e., the machine direction.

FIGURE 10 is a detail illustration of one embodiment of feed tube shaft 24 through which there extends hollow feed tubes 21. If desired, shaft 24 can be made in sections and these sections can be bolted together.

Some shafts may have an over-all length of 24 feet and it is extremely difficult to make a uniform non-sectionalized shaft of this length. Therefore, it is most desirable to produce the shaft in sections and bolt it together. In addition, during the operation of apparatus 1, endless chains 15 and 17 comprising a plurality of inter-connected links, will have to suffer from wear and tear after some period of use. This will cause some of the links to be spread apart from each other thereby causing the upstanding pins 18 or 19 to become intermittently spaced further apart. Therefore, it is desirable to change the spacing of feed tubes 21 so that they correspond to the changed spacing between the pins in each row.

By sectionalizing shaft 24, it is possible to adjust feed tubes 21 along the length of the looping zone 2 so that they are disposed in a position so that they can pass easily between the rows of upstanding pins 18 and 19. Thus, shaft 24 may be a series of pipes provided at their ends with shaft flanges 38 which flanges can be bolted together to make the total length of feed tube shaft 24. If wear and tear of endless chains 15 and 17 occurs, spacers 44 can be inserted between flanges 38 for the purpose of proper alignment of feed tubes 21.

As pointed out previously, shaft 24 possesses collar 26 at each oppositely positioned pair of bridge elements 39. Rotatable collar sleeve 14 is wrapped about collar 26 and connected to pendulum arm 28 through pivoting pin 32. Arm 28 extends from bridge flange 34, which, in turn, is secured to bridge plate 40. Arm 28 is pivotally mounted on flange 34 by pin 30. Behind arm 28 and connected to element 39 is pendulum bearing 36.

Thus, shaft 24 is able to swing back and forth on pendulum arm 28, the degree of swing being limited by the pendulum arm and the jerking motion created by cam 135.

Figure 11:
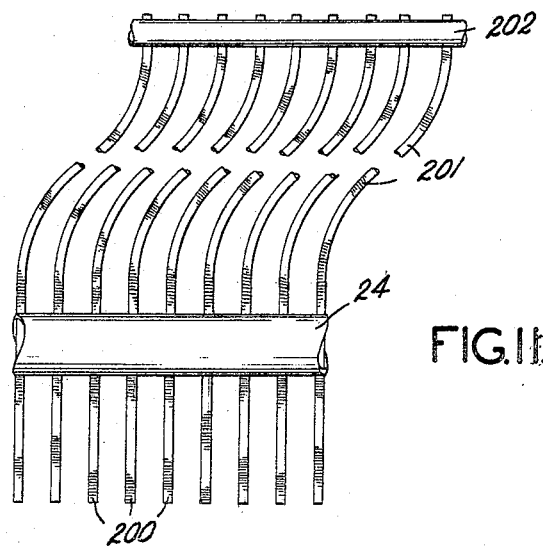
FIGURE 11 is an alternate embodiment of the strand carrier means showing flexible feed tubes.

FIGURE 11 characterizes a different feed tube embodiment. In this embodiment, there are employed flexible feed tubes 200 which extend through feed tube shaft 24. These flexible feed tubes 200 may be made of tightly wound springs of the coil or sheet type, or they may be made of flexible plastic materials such as polyethylene, propropylene, nylon or polyester tubing, and the like. These flexible tubings may possess holes therein or they may be impermeable. Also included are flexible strand guides 201 which extend from shaft 24 to guide holder 202. These strand guides may be made of materials similar to that described with respect to flexible feed tubes 200. The strands may be introduced to guides 201 in an air stream and transported through the open end of tubes 200. If air velocity is a problem in terms of controlling strand looping, holes can be provided in the flexible feed tubes 200 and/or the flexible strand guides 201 so that the velocity can be reduced to a controllable level. Guide holder 202 may be stationary or may oscillate and reciprocate in somewhat the same manner as shaft 24.

The above is a description of the various mechanisms associated with apparatus 1 which achieves the production of the aforementioned strand structures. It should be understood that there can be employed a plurality of looping zones 2, in series, by extending the length of looping zone 2 and using a plurality of trains such as described in FIGURE 6 and a plurality of carriage assemblies 3, reciprocation assemblies 5, oscillation assemblies 7, flipper assemblies 9 and acceleration assemblies 11, all appropriately aligned in series. In this manner, a plurality of feed tube shafts 24 can be aligned in series in looping zone 2 to effect simultaneous lay-down of strand between the rows of pins 18 and 19.

Figure 1A:
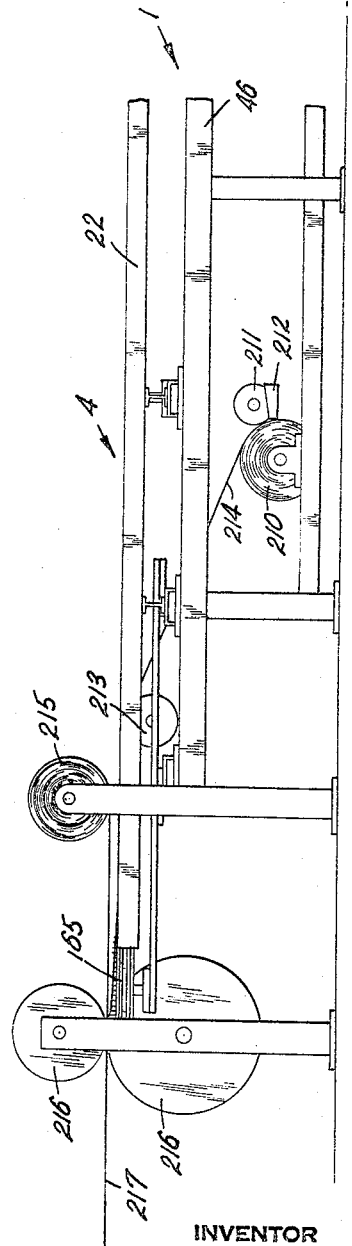
FIGURE 1a is a continuation of the side-elevational view of the apparatus described in FIGURE 1.

The ultimate strand structure is provided in spreading and take-off zone 4. It may also be formed in and withdrawn from looping zone 2. Such product may be withdrawn from the machine in many different ways. For example, the strand structure can be coated with adhesive to effect interbonding of the strands and after curing or drying the adhesive, the structure can be removed from the apparatus. Because these strand structures are superbly suitable for reinforcement of paper, plastic and foil, there is schematically illustrated in FIGURE 1a, a simple mechanism for withdrawing the strand structure from apparatus 1 in zone 4 while simultaneously laminating such to a sheet material, such as foil, plastic, and/or paper. The sheet material is withdrawn from roll 210 and coated with a suitable adhesive by adhesive roll coater 211. Pan 212 is a source of supply of adhesive for roller 211. The coated sheet 214 is then passed over idler tensioning roller 213 and then to about the position of double idler sprocket 165 which serves as the returning point for chain 15. Sheet 214 lifts the structure from the upstanding pins at about sprocket 165 and carries it forward to nip calendar rolls 216 where the strand structure is pressed into the adhesive coated sheet 214. Optionally, there may be supplied another sheet material from roll 215 which is disposed on top of the strand structure and pressed into the strand structure by action of nip rolls 216 to provide reinforced laminate 217.

The strands employed may be made of any fiber, filament, cord and/or wire material. Thus the strand structure may be wire screening, organic fibrous scrim, inorganic fibrous scrim, and the like.

What is claimed is:

1. In a process for continuously making strand structures by means of a pair of laterally-spaced, longitudinally-advancing, parallel, rows of loop-receiving elements and a strand carrier means arranged to oscillate laterally, and to reciprocate longitudinally, between said rows to loop strand alternately around the loop-receiving elements of one said row and then around the loop-receiving elements of the other said row, the steps of:
   flipping said strand carrier means laterally through the spaces between said loop-receiving elements to the outside of a row, at each end of each said lateral oscillation,
   then forcefully accelerating the movement of the said strand carrier means, while outside said row, in a longitudinal path parallel to the path of advance of said loop-receiving elements, and
   then flipping said strand carrier means laterally back through another set of spaces between said loop-receiving elements to a position inside said row,
   to cause each said strand to be rapidly looped around one of said loop-receiving elements at each end of each said oscillation.

2. The process of claim 1, wherein:
said step of accelerating said strand carrier means includes the step of accelerating said means in the direction of advance of said loop-receiving elements.

3. The process of claim 1, wherein:
said step of accelerating said strand carrier means includes the step of accelerating said means in a direction opposite to the direction of advance of said loop-receiving elements.

4. The process of claim 1, wherein:
said outward and inward flipping steps and said acceleration steps of said strand carrier means all take place during a forward stroke of the reciprocatory path of said strand carrier means.

5. The process of claim 1, plus the steps of chain-link supporting said loop-receiving elements in said rows and
continually exerting tension in a longitudinal direction, on the links supporting the elements being looped, to maintain maximum clearances between adjacent elements.

6. The process of claim 1, wherein
said steps include the step of looping each said strand substantially one complete turn around a loop-receiving element in each opposite row to at least partially snub the same thereon, and
then diverging said rows away from each other and increasing the distance therebetween to impart an attenuating force on said partially snubbed strands while spreading the strand structure.

7. The process of claim 6, wherein said spread strand structure is treated with adhesive.

8. The process of claim 6, wherein said spread strand structure is adhesively bonded to sheet material.

9. In an apparatus for making non-woven criss-cross strand structures, of the type having a pair of rows of loop-receiving elements advancing longitudinally along a path at a spaced distance apart, strand carrier means mounted along said path to feed a plurality of strands to said elements, and actuation mechanism oscillating said means laterally, and reciprocating said means longitudinally, between said rows, at predetermined speeds to form said strand structure on said loop-receiving elements, the combination of:
   acceleration means, synchronized with said actuation mechanism, for moving said strand carrier means at each end of each oscillation, outwardly, laterally through one set of spaces between the elements in a row to the outside thereof, then longitudinally along the outside of said elements, and then inwardly, laterally through another set of spaces between said elements, all at a speed greater than the said predetermined speeds, to permit relatively slow oscillation between rows while obtaining relatively rapid looping around said elements at the end of each said oscillation.

10. An apparatus as specified in claim 9, wherein:
said acceleration means is synchronized with said actuation means to cause said longitudinal movement, outside said rows, to wrap said strands for a full turn around said loop-receiving elements, and thereby partially snub the same; and
said apparatus includes means along said path, in rear of said strand carrier means, for diverging said rows of loop-receiving elements to impart an attenuating force to the strands looped therearound.

11. An apparatus as specified in claim 9, wherein:
said strand carrier means includes a longitudinally extending member having strand feed guides spaced therealong, said member being supported on said means for lateral oscillatory motion and longitudinal siding motion, and
said acceleration means is mechanically actuated and includes cam and cam track means powered from said actuation mechanism for assuring synchronized operation.

12. An apparatus as specified in claim 11, wherein:
said acceleration means includes knee joint linkage supporting pulley and belt means for transmitting motion to said strand carrier means during the oscillation and reciprocation thereof between said rows.

13. An apparatus as specified in claim 9, wherein:
said rows of advancing loop-receiving elements comprise spaced pins upstanding from the links of endless chains, and
said apparatus includes tension means operable on said chains to pull said links in a direction to eliminate sag, thereby assuring proper spacing between said pins during said looping.

14. In apparatus for high speed formation of criss-cross, non-woven netting on a pair of laterally spaced, longitudinally advancing rows of loop-receiving elements, said apparatus including a longitudinally-extending strand carrier means carriage-mounted to reciprocate and cradle-mounted to oscillate between said rows at a predetermined speed, the combination of:

acceleration means, operably synchronized with said cradle and carriage, to move said strand carrier means, at the end of each oscillatory stroke, and while said carriage is advancing alongside the adjacent row of loop-receiving elements, at a speed greater than said predetermined speeds, first outwardly through the spaces between said elements, then longitudinally outside said row and then inwardly through another set of said spaces to thereby loop said strands around said elements at high speed.

15. Apparatus for making strand structures, said apparatus being of the type having a pair of parallel, close-spaced, rows of spaced loop-receiving elements advancing along a longitudinal path, a plurality of strand feed guides mounted along said path and automatic actuation mechanism oscillating said guides laterally, and reciprocating said guides longitudinally, to loop said strands on said loop-receiving elements in the form of a criss-cross network, the combination of:

strand feed guide acceleration means, operably connected to, and synchronized with, said automatic actuation mechanism, said acceleration means moving said strand feed guides longitudinally, at increased speed, when the strands thereof are outside said loop-receiving elements to cause said strands to selectively loop around said elements forwardly or rearwardly prior to oscillating inwardly through said elements and over to the other said row.

References Cited

UNITED STATES PATENTS

| | | | |
|---|---|---|---|
| 2,812,797 | 11/1957 | Estee et al. | 156—440 |
| 2,962,080 | 11/1960 | Hirsch | 156—440 |
| 3,321,348 | 5/1963 | Rupp | 156—177 |
| 3,345,231 | 10/1967 | Gidge et al. | 156—441 XR |
| 3,345,232 | 10/1967 | Gidge et al. | 156—181 |

HAROLD ANSHER, Primary Examiner

D. J. FRITSCH, Assistant Examiner

U.S. Cl. X.R.

156—181, 229, 440, 443, 494